(12) United States Patent
Nagata et al.

(10) Patent No.: US 7,163,599 B2
(45) Date of Patent: Jan. 16, 2007

(54) METHOD AND APPARATUS FOR STICKING POLARIZER TO SUBSTRATE

(75) Inventors: Katsunori Nagata, Yamatokoriyama (JP); Shunsuke Okajima, Matsuzaka (JP); Kazuya Yoshimura, Suzuka (JP); Koji Ikeda, Yamatotakada (JP); Yoshihisa Konishi, Nara-ken (JP); Nobuhiro Tone, Tenri (JP); Tomohiro Nagasato, Kashiba (JP); Ichiro Kawashima, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/828,305

(22) Filed: Apr. 21, 2004

(65) Prior Publication Data

US 2004/0233529 A1   Nov. 25, 2004

(30) Foreign Application Priority Data

Apr. 22, 2003   (JP) .............................. 2003-116654

(51) Int. Cl.
*B32B 37/00*   (2006.01)

(52) U.S. Cl. ....................... 156/249; 156/542; 156/556

(58) Field of Classification Search ................ 156/230, 156/234, 235, 238, 247, 249, 538, 539, 540, 156/541, 542, 556
See application file for complete search history.

(56) References Cited

U.S. PATENT DOCUMENTS

| | | | | |
|---|---|---|---|---|
| 5,568,297 A | * | 10/1996 | Tsubota et al. | ............. 156/145 |
| 5,631,107 A | * | 5/1997 | Tarumi et al. | ................. 430/1 |
| 6,340,404 B1 | * | 1/2002 | Oka et al. | ................... 156/230 |
| 6,547,910 B1 | * | 4/2003 | Benzing et al. | ............. 156/212 |

FOREIGN PATENT DOCUMENTS

| | | |
|---|---|---|
| JP | 8-50290 A | 2/1996 |
| JP | 2002-23151 A | 1/2002 |

* cited by examiner

*Primary Examiner*—James Sells
(74) *Attorney, Agent, or Firm*—Birch, Stewart, Kolasch & Birch, LLP

(57) ABSTRACT

There is provided a method and apparatus for sticking a polarizer to a liquid crystal panel. The method includes advancing a liquid crystal panel or similar substrate along a conveyance line, peeling a separate sheet from a polarizer to expose an adhesive layer, and sticking the polarizer to the liquid crystal panel or other substrate.

6 Claims, 14 Drawing Sheets

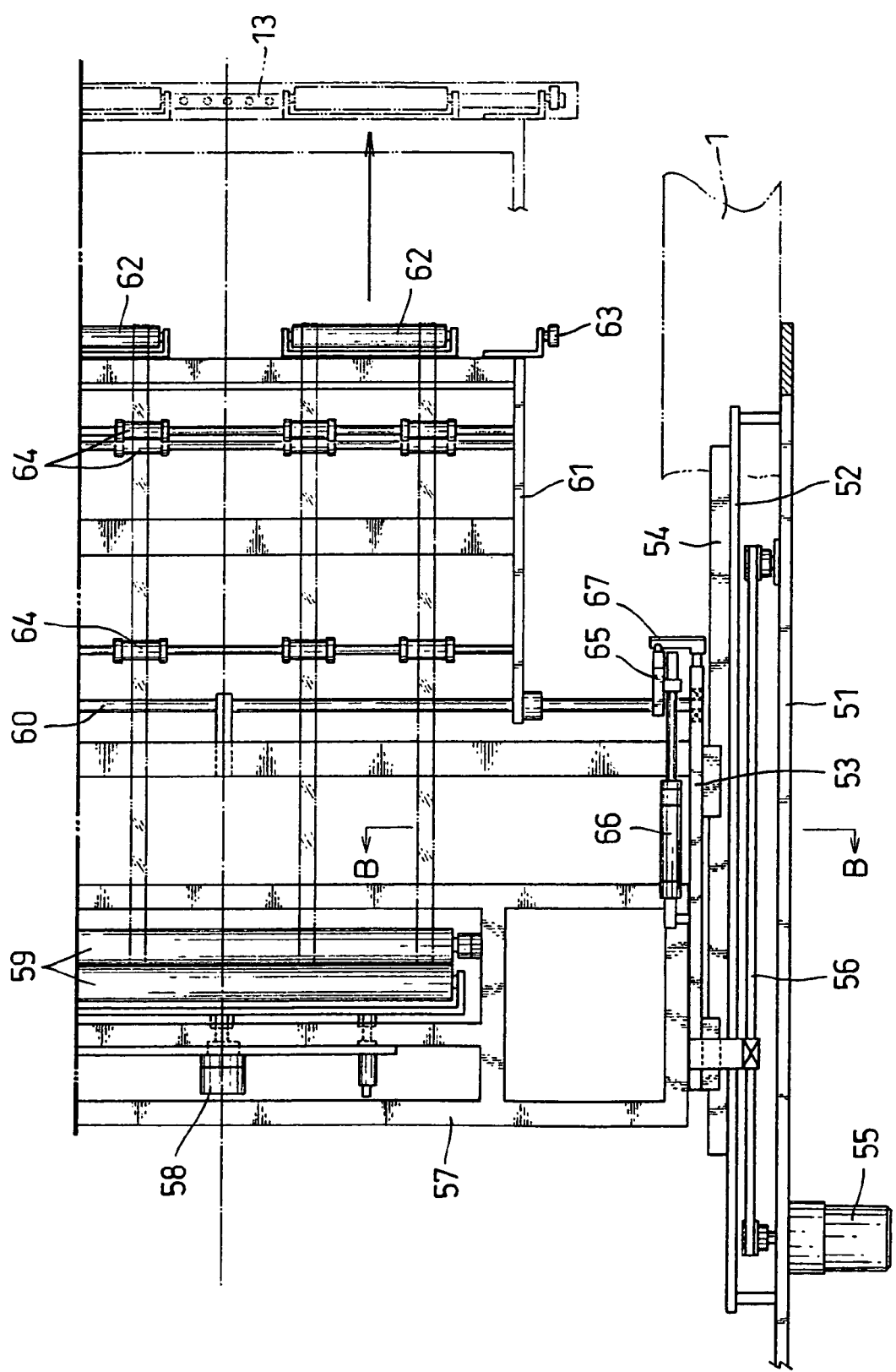

METHOD AND APPARATUS FOR STICKING POLARIZER TO SUBSTRATE

This Non-provisional application claims priority under 35 U.S.C. § 119(a) on patent application Ser. No(s). 2003-116654 filed in Japan on Apr. 22, 2003, the entire contents of which are hereby incorporated by reference.

BACKGROUND OF THE INVENTION

1. Field of the Invention

The present invention relates to a method and apparatus for sticking a polarizer to a substrate and, more particularly, to a method and apparatus for sticking a polarizer to a substrate such as a liquid crystal panel with an adhesive layer while peeling a separate sheet.

2. Prior Art

Generally, a liquid crystal panel is formed by sealing a liquid crystal material in a space in a liquid crystal cell formed between facing surfaces of two glass substrates and may include sticking a polarizer to an outer surface of each of the two glass substrates in the liquid crystal panel.

The polarizer has a stacked structure in which a polarizing film for polarizing light is used as a base material, one of surfaces of the polarizer is covered with a protection film, and an adhesive layer applied on the other surface is protected by a separate sheet.

In a process of manufacturing a liquid crystal panel, the polarizer is stuck to the liquid crystal panel by peeling the separate sheet on the polarizer to expose the adhesive layer and sticking the polarizer to an outer surface of the glass substrate with the exposed adhesive layer.

When the work of sticking the polarizer to the liquid crystal panel is performed manually, the work efficiency is extremely low, and variations occur in the finished product. Consequently, an apparatus for automatically sticking a polarizer to a liquid crystal panel has already been proposed.

A conventional apparatus for automatically performing the sticking operation has at least two stages, a liquid crystal panel receiving mechanism and an sticking mechanism. A table reciprocates between the two stages to stick the polarizer to the liquid crystal panel while peeling the separate sheet.

A work process in the conventional sticking apparatus having such a configuration includes the following steps.

(1) In the liquid crystal panel receiving mechanism, the liquid crystal panel is set on the table and is simultaneously positioned.

(2) The table comes to a predetermined position in the sticking mechanism.

(3) A polarizer is supplied onto an adhesive belt of the sticking mechanism and is adhered on an adhesive surface of the adhesive belt.

(4) By feeding the adhesive belt, the polarizer is guided by a wedge-shaped guide member and moves obliquely while a separate sheet is peeled by using a guide roller as a base point.

(5) The tip of the polarizer from which the separate sheet is being peeled is pressed against the top surface of the liquid crystal panel by a press roller and the table is moved back, thereby sticking the polarizer onto the liquid crystal panel.

(6) The liquid crystal panel on which the polarizer is stuck is taken from the table (refer to, for example, Japanese Unexamined Patent Publication No. 8-50290).

As another conventional apparatus for performing automatic sticking, an apparatus having a table on which a liquid crystal panel is vacuum held and a table on which a polarizer is vacuum held is proposed. The tables are moved among a supply stage, a separate sheet peeling stage, a sticking stage, and the like, and a sticking process is automatically carried out (refer to, for example, Japanese Unexamined Patent Publication No. 2002-23151).

In the former conventional apparatus, the polarizer is stuck to the liquid crystal panel while the table moves between the two stages, so that an install space which is twice as large as the size of the liquid crystal panel or the polarizer is necessary. Consequently, the apparatus has a problem such that it is not suitable for sticking a polarizer to a large liquid crystal panel.

A large liquid crystal panel here denotes a panel having a size of 25 inches or larger. For example, a liquid crystal panel of 45 inches has a length of about 1000 mm and a width of about 600 mm. A polarizer to be stuck to such a large liquid crystal panel also has the same size. In the former conventional apparatus, therefore, an extremely wide install space has to be assured.

Since the polarizer is stuck to the liquid crystal panel by reciprocating the table and the work of removing the liquid crystal panel to which the polarizer is stuck from the table is necessary, the work efficiency of the polarizer sticking process is very low.

Further, at the time of sticking the polarizer and the liquid crystal panel, as shown in FIG. 2 of Patent Japanese Unexamined Publication No. 8-50290, a wedge-shaped guide member is interposed between the liquid crystal panel and the polarizer.

As understood from FIG. 2 of Publication No. 8-50290, a considerably large space is necessary between the liquid crystal panel and the tip of the polarizer.

This is because it is limited to thin the guide member, a guide roller for peeling a separate film is provided at the tip of the guide member and, further, a space to prevent the adhesive surface of the adhesive belt from coming into contact with the liquid crystal panel is necessary.

In a state where such a large space is provided, when a press roller is lowered to press the polarizer against the top surface of the liquid crystal panel, the polarizer having even a large angle is pressed against the liquid crystal panel.

As a result, the portion against which the polarizer is pressed is largely curved (distorted) and is damaged. In addition, a characteristic change may occur and the function of the polarizer itself may deteriorate. Moreover, when the space between the liquid crystal panel and the polarizer is large, air bubbles and the like tend to enter at the time of sticking, and it may cause poor sticking.

The polarizer is constructed so as to move on the guide member by the feed travel of the adhesive belt in a state where the polarizer is adhered by the adhesive belt using an adhesive tape such as Scotch tape.

It is important to stick the liquid crystal panel and the polarizer while maintaining the accurately positioned state.

In the conventional apparatus, however, the polarizer is simply held by being adhered by the adhesive belt of the material such as Scotch tape. The polarizer is moved by travel of the adhesive belt. Moreover, the separate film is peeled at the tip of the guide member, and the tip portion of the polarizer is pressed so as to be stuck to the liquid crystal panel. Consequently, even a slight deviation from the intended path of travel of the adhesive belt causes a positional deviation in the polarizer. As a result, an adverse influence is exerted on sticking precision. Particularly, in the case of a large polarizer, there is limitation in such a moving method.

In the conventional apparatus as described above, the adverse influence on sticking precision is not the only problem. Since the polarizer and the liquid crystal panel in the sticking end portion are apart from each other, just before the end of sticking, the end portion of the polarizer suffers warping. It causes poor sticking due to air bubbles.

Further, for the same reasons, the latter conventional apparatus is also not suitable for sticking of a polarizer to a large liquid crystal panel and also has a problem of low work efficiency.

SUMMARY OF THE INVENTION

A feature of the present invention is, therefore, provision of a method and apparatus for sticking a polarizer to a liquid crystal panel with high precision operating within a smaller space. A feature of the invention is use of a stageless (tableless) structure in which a polarizer sticking unit is provided on a conveyance line of a liquid crystal panel. The invention is suitable for sticking of a polarizer particularly to a large liquid crystal panel, and realizing extremely high work efficiency, improved throughput, and prevention of occurrence of air bubbles at the time of sticking of a polarizer to a liquid crystal panel.

The invention relates to a method of sticking a polarizer to a substrate wherein, while moving a substrate in one direction along a conveyance line from a carry-in side to a carry-out side, a separate sheet of a polarizer is peeled to expose an adhesive layer, and the polarizer is stuck to the substrate.

Another feature of the invention is that a polarizer is stuck to the substrate in a state where a horizontal surface parallel with the movement direction of the substrate, of a mounting surface of the polarizer is tilted.

Another feature of the invention includes a configuration in which at the time of sticking a polarizer to the substrate, the polarizer is stuck with an end portion of the polarizer held.

The invention may further include an apparatus for sticking a polarizer to a substrate, including: a conveyance line for moving a substrate in one direction from a carry-in side to a carry-out side; a polarizer sticking unit for holding a polarizer; and a peel unit for peeling a separate sheet which is preliminarily adhered on a surface of the polarizer held, characterized in that the polarizer sticking unit has a sticking roller for pressing the polarizer against the substrate in a sticking position which is set in the conveyance line to thereby stick the polarizer onto the substrate.

The invention of may also include a configuration in which a mechanism for holding an end portion of the polarizer while moving so as to follow the movement of the polarizer is provided.

A further feature of the invention is a configuration in which the polarizer sticking unit has a mounting surface tilting mechanism for tilting a horizontal surface parallel with the movement direction of the substrate, of the mounting surface of the polarizer at the time of sticking the polarizer to the substrate.

Yet another possible feature of the invention is a configuration in which the sticking roller is rotatably supported by a roller supporting member, and the roller supporting member is supported in an elevation box which is elevated by a driver via a cushioning material.

The invention may also include a configuration in which a press roller mechanism for sandwiching the substrate in corporation with the sticking roller is provided in a position opposite to the sticking roller.

BRIEF DESCRIPTION OF THE DRAWINGS

FIG. 10 is a plan view of the unit of FIG. 9 with a part omitted;

DESCRIPTION OF THE PREFERRED EMBOIMENTS

An embodiment of the invention will be described hereinbelow with reference to the attached drawings.

Figure 1:
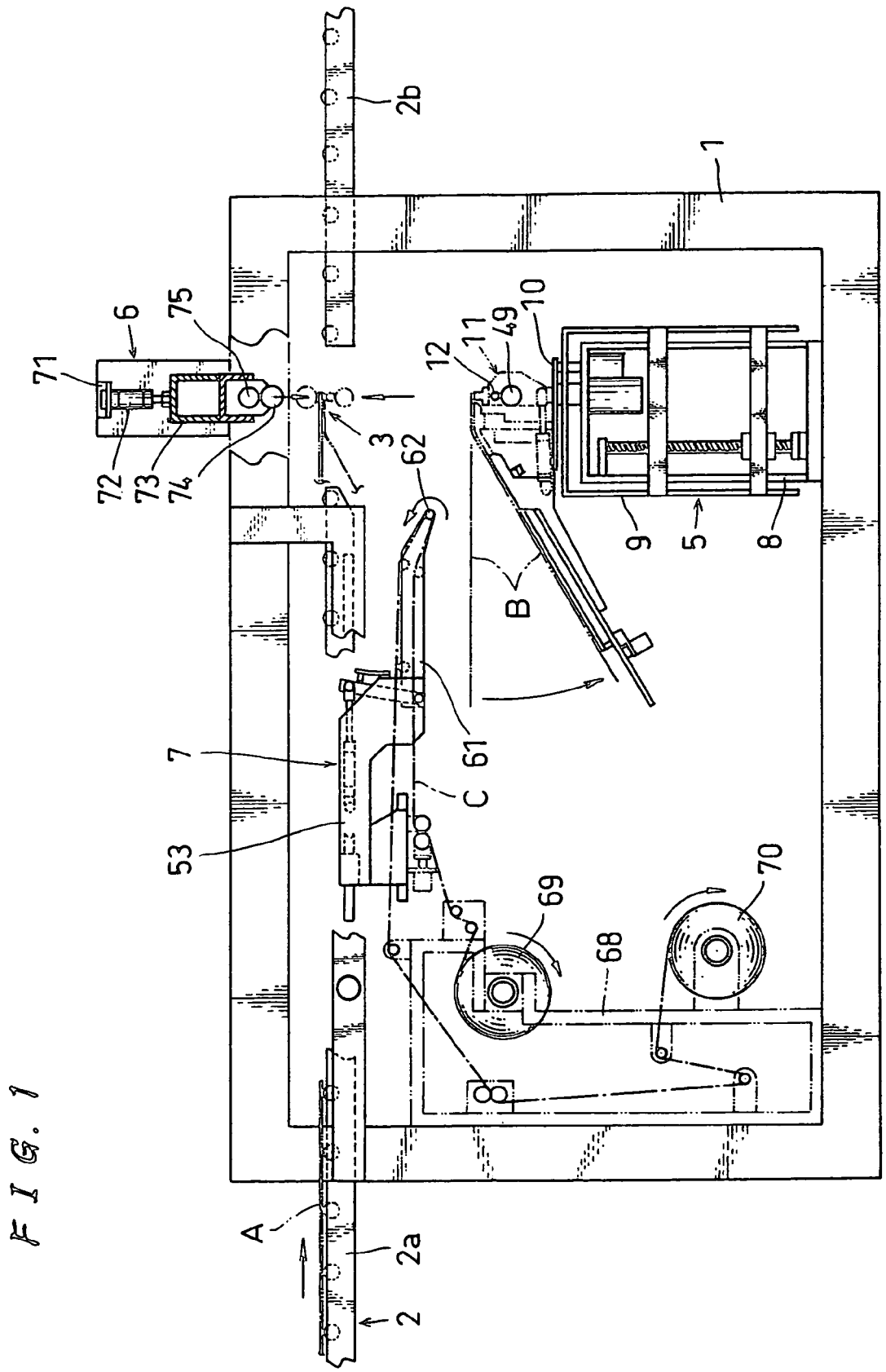
FIG. 1 is a front view showing a general structure of an apparatus for sticking a polarizer to a liquid crystal panel according to the invention.
Figure 2:
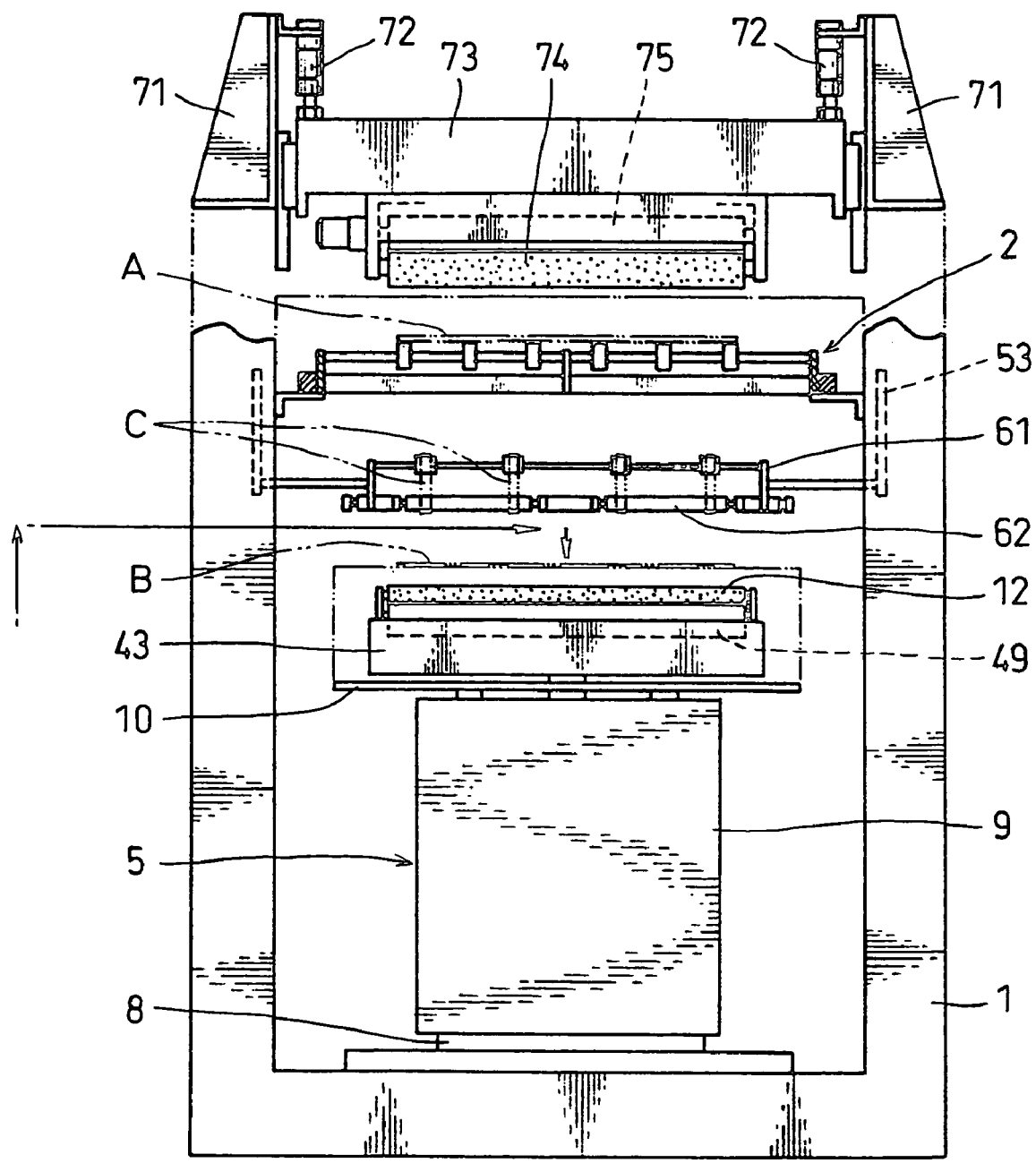
FIG. 2 is a right side view of the apparatus of FIG. 1.

FIG. 1 shows a general structure of an apparatus for sticking a polarizer to a liquid crystal panel (substrate). A conveyance line 2 of a liquid crystal panel A is disposed horizontally in an upper part of a support stage body 1. The conveyance line 2 is a conveyance path for a liquid crystal panel, in which a roller conveyer 2a on the carry-in side, a roller conveyer 2b on the carry-out side, and a sticking position 3 of a polarizer B provided between the roller conveyers 2a and 2b with a predetermined interval are arranged linearly. A polarizer sticking unit 5 is disposed in a position just below the sticking position 3. A press roller mechanism 6 which can be moved vertically is disposed in a position just above the sticking position 3. A separate sheet peeling unit 7 is disposed in a position below the roller conveyer 2a on the carry-in side.

The polarizer sticking unit 5 is constructed by mounting an elevating frame 9 on a fixed frame 8. Frame 9 has both side-surfaces open and is fixed to the support stage body 1. The apparatus includes a tilting base 10 disposed on the top surface of the elevating frame 9, a mounting member 11 serving a surface on which the polarizer B is mounted, a sticking roller 12 which is vertically movable in a position below the tip of the mounting member 11, a first vacuum holder 13 (FIG. 3) which rises and swings in a position of the tip portion of the mounting member 11, a second vacuum holder 14 provided at the tip portion of the mounting member 11, and a third vacuum holder 15 positioned in some midpoint of the mounting member 11.

The elevating frame 9 is formed so that its both side surfaces which fit on the fixed frame 8 are open. The elevating frame 9 is movable in the vertical direction along a vertical guide rail 16 and a vertical slider 17 as guides. A ball nut 20 of a ball screw 19 interlocked with a motor 18 in the fixed frame 8 is coupled to the elevating frame 9, and the elevating frame 9 moves vertically by the driving of the motor 18.

A base shaft 22 is rotatably supported by bearings 21 fixed in positions of both sides on the top surface of the elevating frame 9. The tilting base 10 has, on its top surface, a pair of upright supporting plates 23 positioned on both sides and a perpendicular plate 24 provided between the tips of the supporting plates 23. The supporting plates 23 are mounted to the base shaft 22 so as to swing, a cylinder 25 whose lower end is attached to the elevating frame 9 so as to swing and the lower part of the tip are coupled, and the tilting base 10 tilts so that the tip rises at a predetermined angle from the horizontal state by using the base shaft 22 as a fulcrum by expansion/contraction of the cylinder 25.

The mounting member 11 of the polarizer B is formed by: a pair of guide plates 26 which are fixed to the corner formed with the perpendicular plate 24 above the supporting plates 23 on both sides and are curved so that their rear sides are down; a pair of side plates 27 fixed to the external surfaces of the supporting plates 23 and tilted so that their rear sides are down; a tilted bottom plate 28 extended on the bottom side between the side plates 27; a mobile base 31 which is movable in the longitudinal direction along the rails 29 provided on both sides of the bottom plate 28 by a motor 30 attached under the rear end of the bottom plate 28; the third vacuum holders 15 attached in positions on both sides of the tip side of the mobile base 31; a pair of mounting plates 32 which are positioned on both sides between the third vacuum holders 15 and long in the longitudinal direction and are fixed on the bottom plate 28 so as to cross over the mobile base 31; and a sensor 33 attached to the mobile base 31 and sensing the rear end of the polarizer B.

Figure 8:
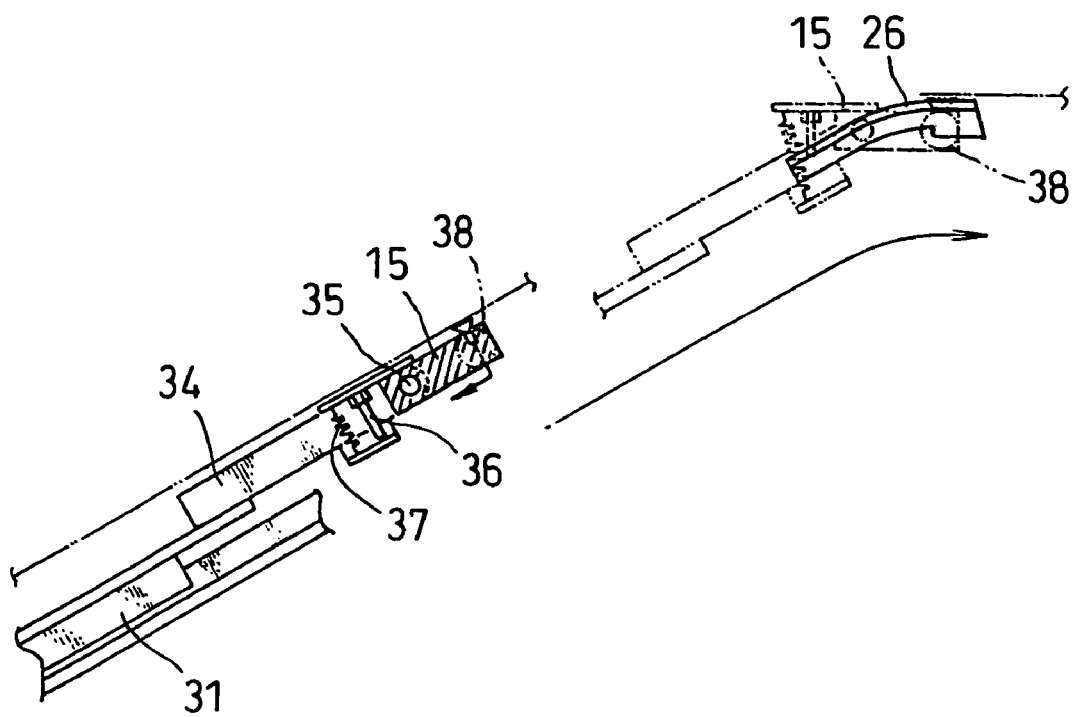
FIG. 8 is a diagram taken along line A—A of FIG. 7.
Figure 11:
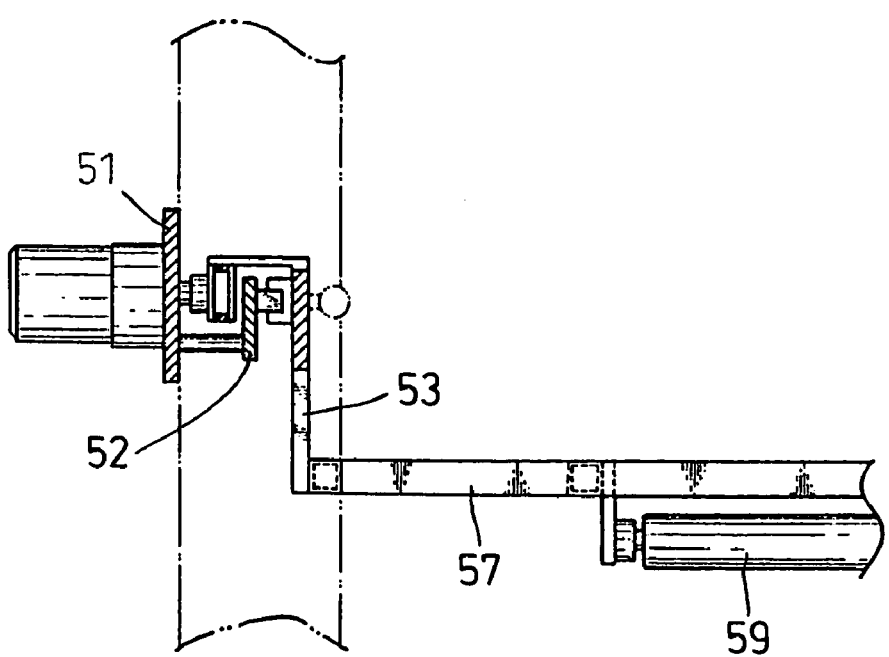
FIG. 11 is a section taken along line B—B of FIG. 10.

The top surface of the mounting plate 32 is disposed so as to be flush with the top surface which is inclined of the guide plate 26, and the supplied polarizer B is supported on the mounting plate 32 from the guide plate 26. As shown in FIG. 8, the third vacuum holder 15 is stopped by a shaft 35 at the tip of an arm 34 fixed to the mobile base 31, and elasticity to return to an extended state is given to the arm 34 of the mobile base 31 by a stopper 36 and a spring 37. From such a state, the third vacuum holder 15 can swing downward with the shaft 35 as a fulcrum to vacuum hold the polarizer B supported on the mounting plate 32 by a vacuum holding pad provided on the top face of the third vacuum holder 15. A guide roller 38 is attached to the outer surface of the third vacuum holder 15. When the third vacuum holder 15 comes close to the guide plate 26, the guide roller 38 is fit in a cut groove formed in the under surface of the guide plate 26 to thereby hold the third vacuum holder 15 in a horizontal state.

Figure 3:
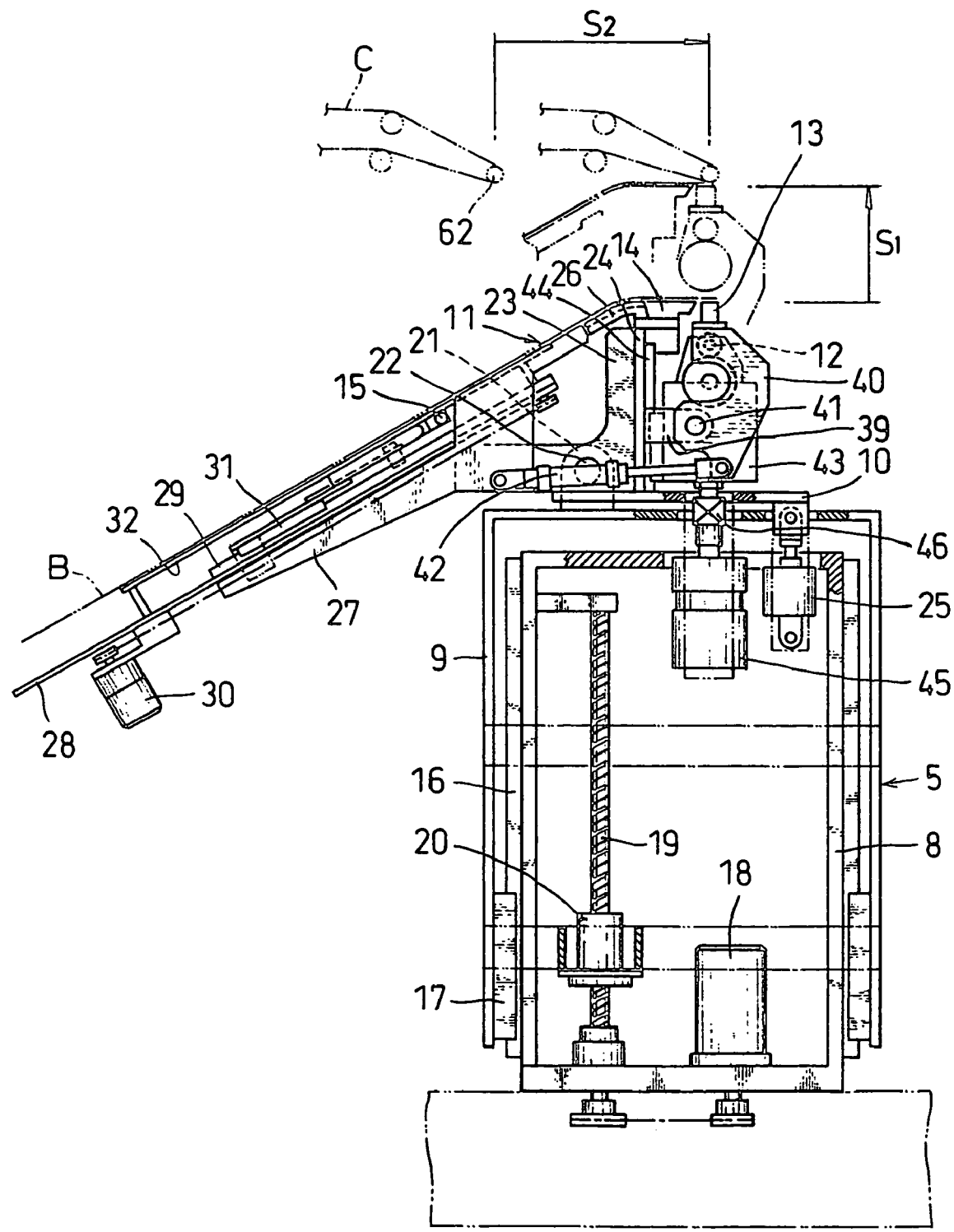
FIG. 3 is an enlarged front view showing the details of a polarizer sticking unit.

The first vacuum holder 13 is attached in such a manner that, as shown in FIG. 3, a pair of swing plates 40 attached to bearings 39 fixed to both ends on the front surface side of the perpendicular plate 24 are pivotally connected by a spindle 41. A cylinder 42 attached to the side plate 27 is coupled to the lower parts of the swing plates 40. The first vacuum holder 13 having a long hollow cylindrical shape is suspended between the upper ends of the swing plates 40.

The lower part of the tip of the polarizer B is vacuum held by the vacuum holding pad 13a provided on the top surface of the first vacuum holder 13. When the cylinder 42 contracts after stopping the vacuum holding, the first vacuum holder 13 tilts forward and moves apart from the tip of the polarizer B.

The second vacuum holder 14 is a long hollow vessel and is fixed horizontally to the upper end of the perpendicular plate 24 between the guide plates 26 so as to project forward. The top surface in which a number of small vacuum holes 14a are formed is flush with the top surface in the horizontal part of the guide plate 26.

Figure 6:
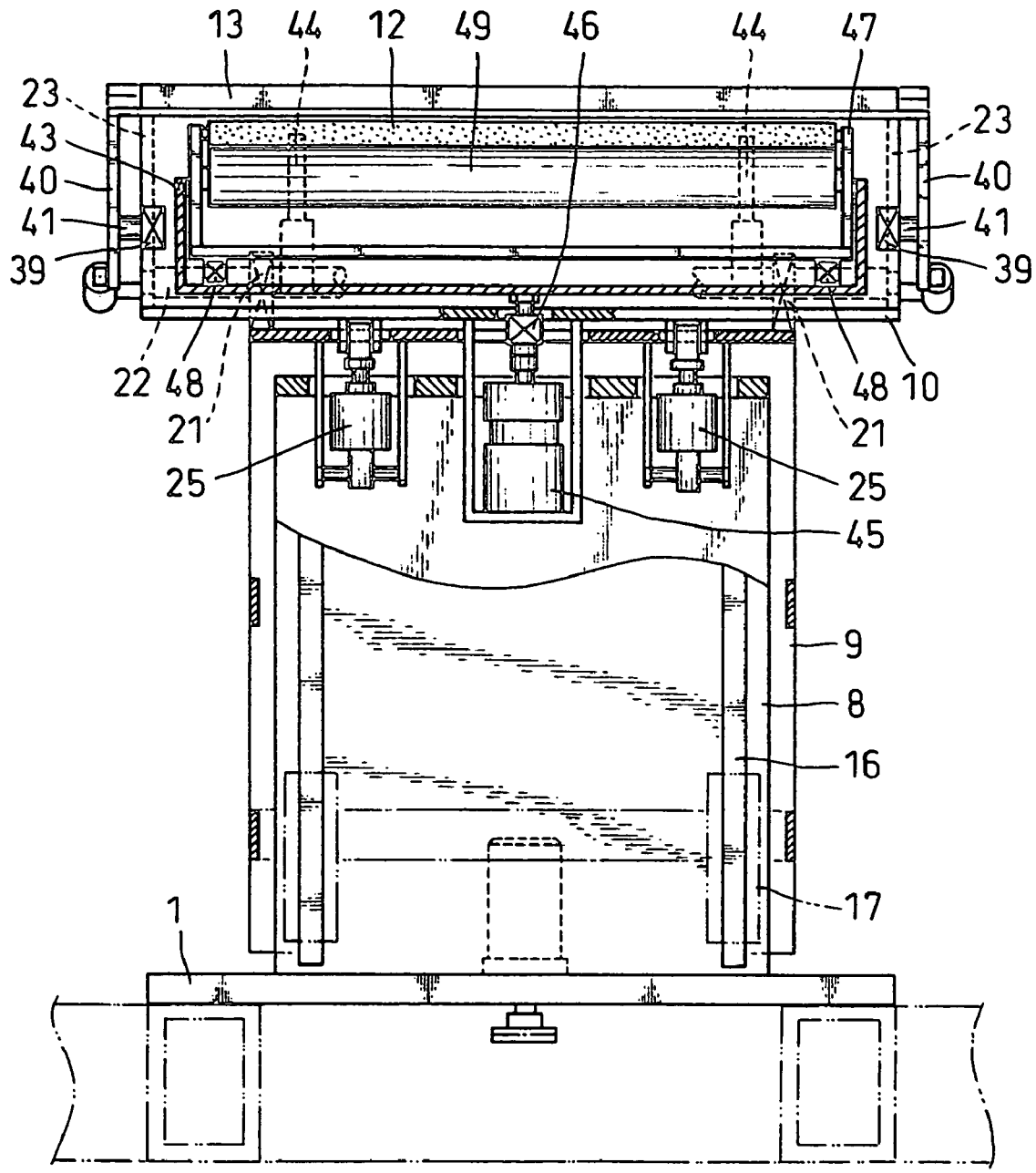
FIG. 6 is a partly-cutaway right side view of the apparatus.
Figure 7:
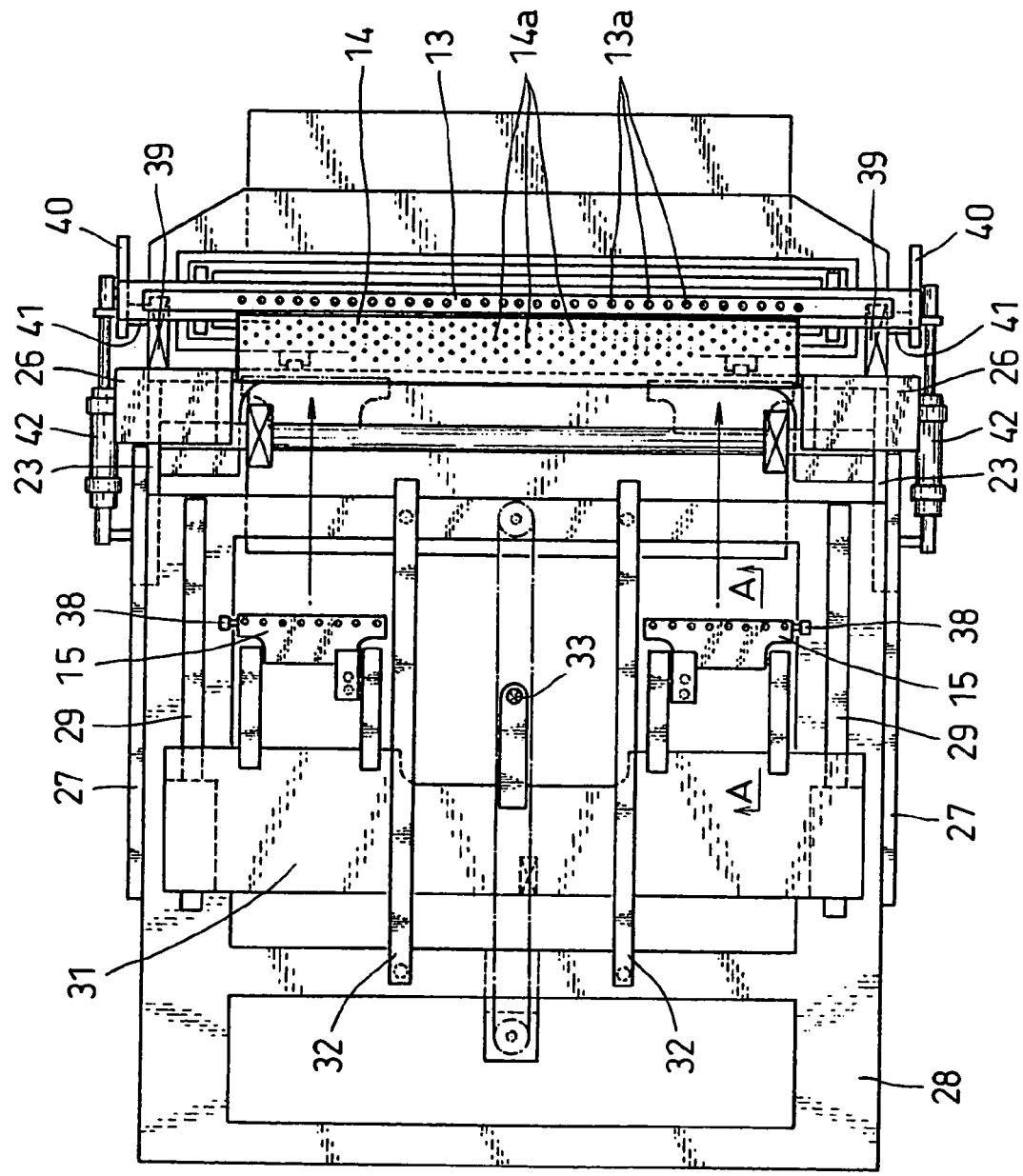
FIG. 7 is a plan view of the unit of FIG. 3.

The structure of supporting the sticking roller 12 is as shown in FIGS. 3 and 6. An elevating box 43 which is disposed on the top surface of the tilting base 10 and whose top surface is open is vertically movable along a guide 44 provided on the front surface of the perpendicular plate 24. The elevating box 43 and a cylinder 45 attached to the under surface of the tilting base 10 are linked via a load cell 46 for pressure adjustment of the cylinder 45. By expansion/contraction of the cylinder 45, the elevating box 43 is moved in the vertical direction. A roller supporting member 47 housed in the elevating box 43 is supported by elastic buffer members 48 disposed at both ends in the elevating box 43. In an upper part of the roller supporting member 47, the sticking roller 12 and a backup roller 49 which is in contact with the lower part of the sticking roller 12 are suspended rotatably.

As described above, the sticking roller 12 is a floating structure which is supported via the elastic buffer members 48 as a kind of a shock absorber. Consequently, a sticking pressure of the polarizer B to the liquid crystal panel A is optimum, and no stress is given to the liquid crystal panel A.

Figure 9:
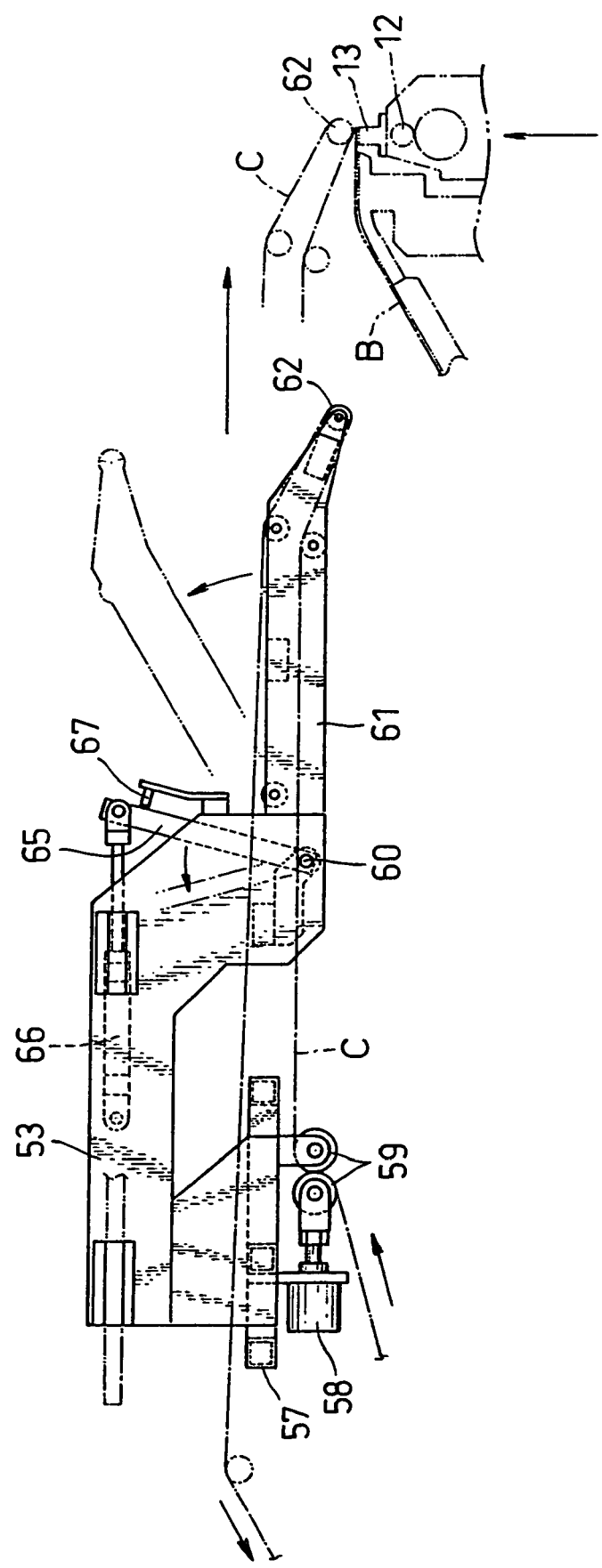
FIG. 9 is an enlarged front view showing the details of a separate sheet peel unit.

The structure of the separate sheet peeling unit 7 is as shown in FIGS. 1, 9, and 10. A horizontal guide plate 52 is provided on the facing inner surfaces of plate-shaped brackets 51 disposed on both sides by being fixed to the supporting stage body 1. A mobile frame 53 disposed between the facing plate-shaped brackets 51 is supported to be horizontally movable in the longitudinal direction along rails 54 of the guide plate 52. An endless travel member 56 driven by a motor 55 attached to the plate-shaped bracket 51 and the mobile frame 53 are linked, and the mobile frame 53 moves in the longitudinal direction by the rotation of the motor 55.

A pair of stop rollers 59 which come into pressure contact by the action of the cylinder 58 is rotatably connected to a frame body 57 provided below the rear portion of the mobile frame 53. Rear ends of a pair of tilting frames 61 are pivotally connected by a rotary shaft 60 suspended in the front portion of the mobile frame 53. A peel roller 62 is rotatably connected to the front end which is slightly bent downward between the tilting frames 61. A guide rotator 63 is rotatably connected in a position of the outer surface of each of the both front ends. A plurality of guide rollers 64 are rotatably connected in some midpoints of the tilting frames 61.

An upper end of a tilt lever 65 whose lower end is fixed to the rotary shaft 60 is coupled to a cylinder 66 attached to the mobile frame 53. In a state where the tilt lever 65 is in contact with a stopper 67 provided for the mobile frame 53, the tilting frame 61 maintains the horizontal posture. When the cylinder 66 contracts, the tilting frame 61 tilts upward by using the rotary shaft 60 as a fulcrum.

In a support stand 68 provided in a position rearward of the separate sheet peeling unit 7, an adhesive tape supply roll 69 for peeling the separate sheet is provided in an upper position, and an adhesive tape take-up roll 70 including a roll of the separate sheet is provided in a lower position. An adhesive tape C led from the adhesive tape supply roll 69 extends between the stop rollers 59 via the guide rollers 64 to the position under the peel roller 62, folded up by the separate roller 62, guided by the guide rollers 64, and taken up by the adhesive tape take-up roll 70. By the rotation of the adhesive tape supply roll 69 and the adhesive take-up roll 70 by the motor, the adhesive tape C travels in the above-described route in the counterclockwise direction of FIG. 1.

The press roller mechanism 6 which is elevatable in a position just above the sticking position 3 has a structure as shown in FIG. 1. An elevation beam 73 which moves vertically by a cylinder 72 is provided for a support bar 71 fixed in the upper part of the support stand body 1. A press roller 74 is rotatably attached below the elevation beam 73, and a backup roller 75 is rotatably attached on the press roller 74.

In place of the press roller mechanism 6, for example, the liquid crystal panel A may be sandwiched by providing a roller mechanism or the like which is preliminarily fixed in a position opposite to the sticking roller 12.

Figure 17:
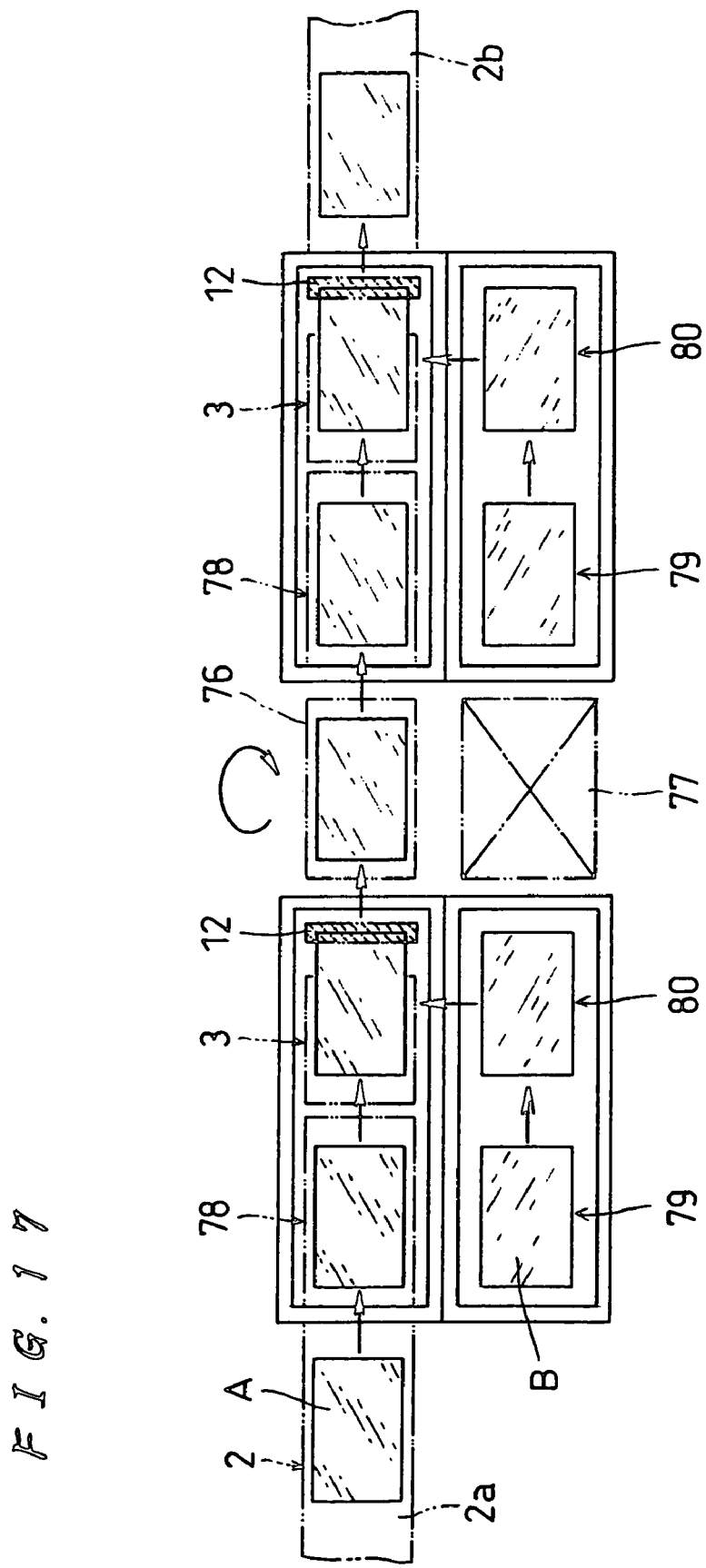
FIG. 17 is a schematic plan view showing an example of a polarizer sticking process using the apparatus for sticking a polarizer to a liquid crystal panel according to the invention.

FIG. 17 is a plan view showing an example of sticking a polarizer by using the apparatus for sticking a polarizer to a liquid crystal panel of the invention. Between the roller conveyer 2a on the carry-in side and the roller conveyer 2b on the carry-out side as the conveyance line 2 for the liquid crystal panel A, a polarizer sticking part in a front stage and a polarizer sticking part in a rear stage having the same configuration are disposed in series. Between the polarizer sticking parts in the front and rear stages, a reverse position 76 of the liquid crystal panel A and a control panel 77 are disposed.

In each of the front and rear polarizer sticking parts, an alignment position 78 of the liquid crystal panel A and the sticking position 3 are arranged in series on the conveyance line 2. On the side of the conveyance line 2, a stock position 79 of the polarizer B and a polarizer alignment position 80 in which the polarizer B supplied from the stock position 79 is positioned and from which the polarizer B is supplied to a fixed position in the sticking position 3a reset. The polarizer sticking apparatus of the invention is mounted in the sticking position 3.

A general process of sticking a polarizer will be described. In a preceding process, after a washing process for cullet removal, the liquid crystal panel A is conveyed to the polarizer sticking part in the front stage by the roller conveyer 2a on the carry-in side. The liquid crystal panel A is positioned in the alignment position 78 and, after that, sent to the sticking position 3. Simultaneously, the polarizer B supplied from the stock position 79 to the polarizer alignment position 80 is positioned and sent to the sticking position 3. In the sticking position 3, the polarizer B is stuck onto one of surfaces of the liquid crystal panel A. After that, the liquid crystal panel A is reversed in the reverse position 76. The polarizer B is stuck onto the other surface of the liquid crystal panel A by the polarizer sticking part in the latter stage by a process similar to the above-described process. The liquid crystal panel A to which the polarizers B are stuck on both sides is sent to TAB and PCB processes as post processes by the roller conveyer 2b on the carry-out side.

The polarizer sticking apparatus of the invention has the configuration as described above. A polarizer sticking method using the polarizer sticking apparatus will now be described concretely.

Figure 16:
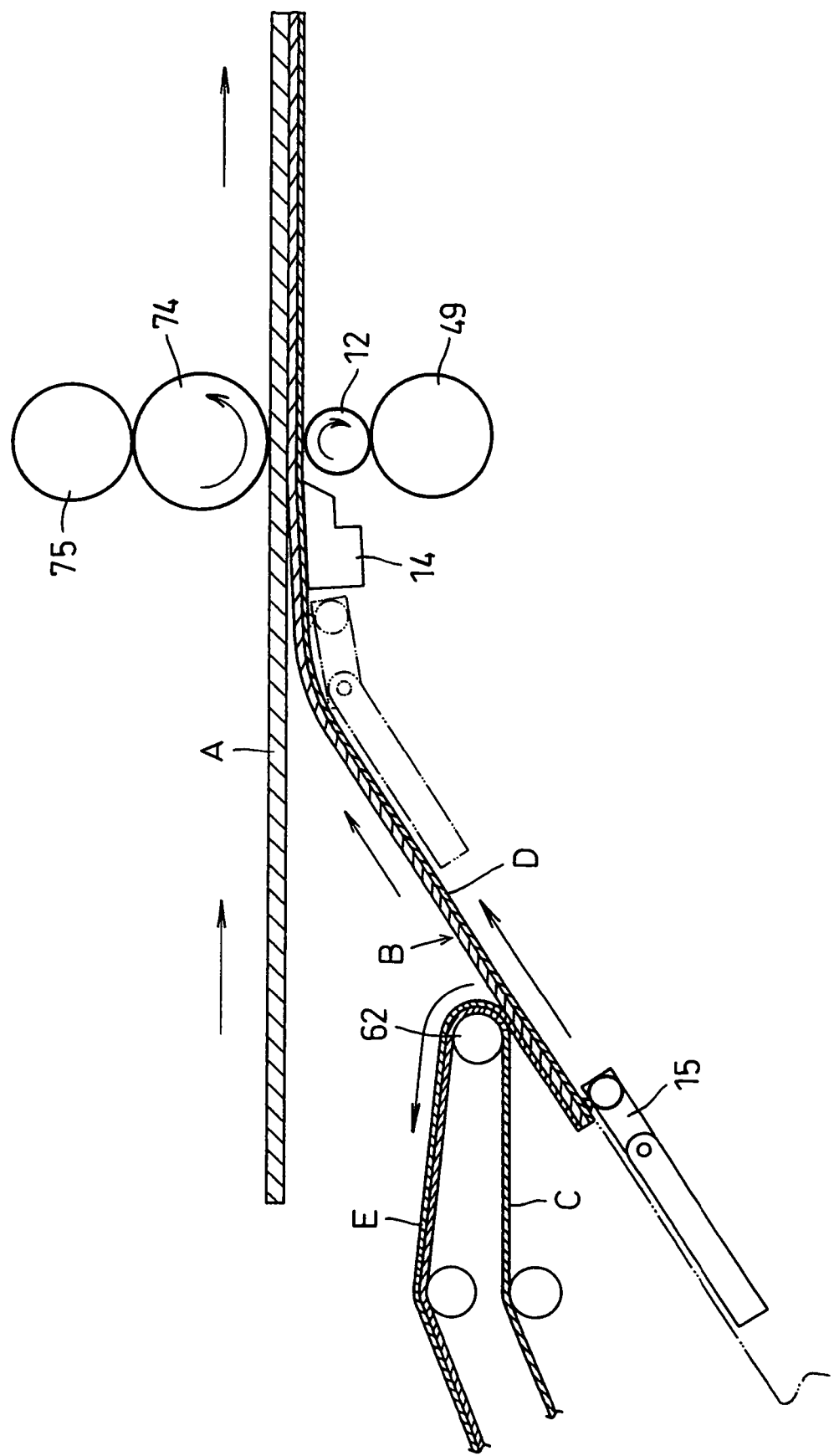
FIG. 16 is an explanatory diagram showing a halfway state of the sticking of the polarizer to the liquid crystal panel.

As the liquid crystal panel A, a liquid crystal panel of a large size is used here. The polarizer B is preliminarily cut in a size which coincides with the size of the liquid crystal panel A. As shown in FIG. 16, the polarizer B has a layer-stacked structure in which one of its surfaces is covered with the protection film D and an adhesive layer provided on the other surface is protected with a separate sheet E.

FIG. 1 shows a state before the sticking work. For the sticking position 3 in the conveyance line 2 of the liquid crystal panel A, in the polarizer sticking unit 5, the mounting member 11 of the polarizer B stands by in the lowered position, the first vacuum holder 13 is upright. The tilting base 10 becomes horizontal so that the first and second vacuum holders 13 and 14 are in a horizontal state. The sticking roller 12 is in a lowered position. In the press roller mechanism 6, the press roller 74 stands by in an elevated position upper than the conveyance line 2. In the separate sheet peeling unit 7, the mobile frame 53 is in a receded position with respect to the polarizer sticking unit 5, and the tip peel roller 62 of the tilting frame 61 which is held horizontally is positioned near to the rear over the mounting member 11.

Figure 12:
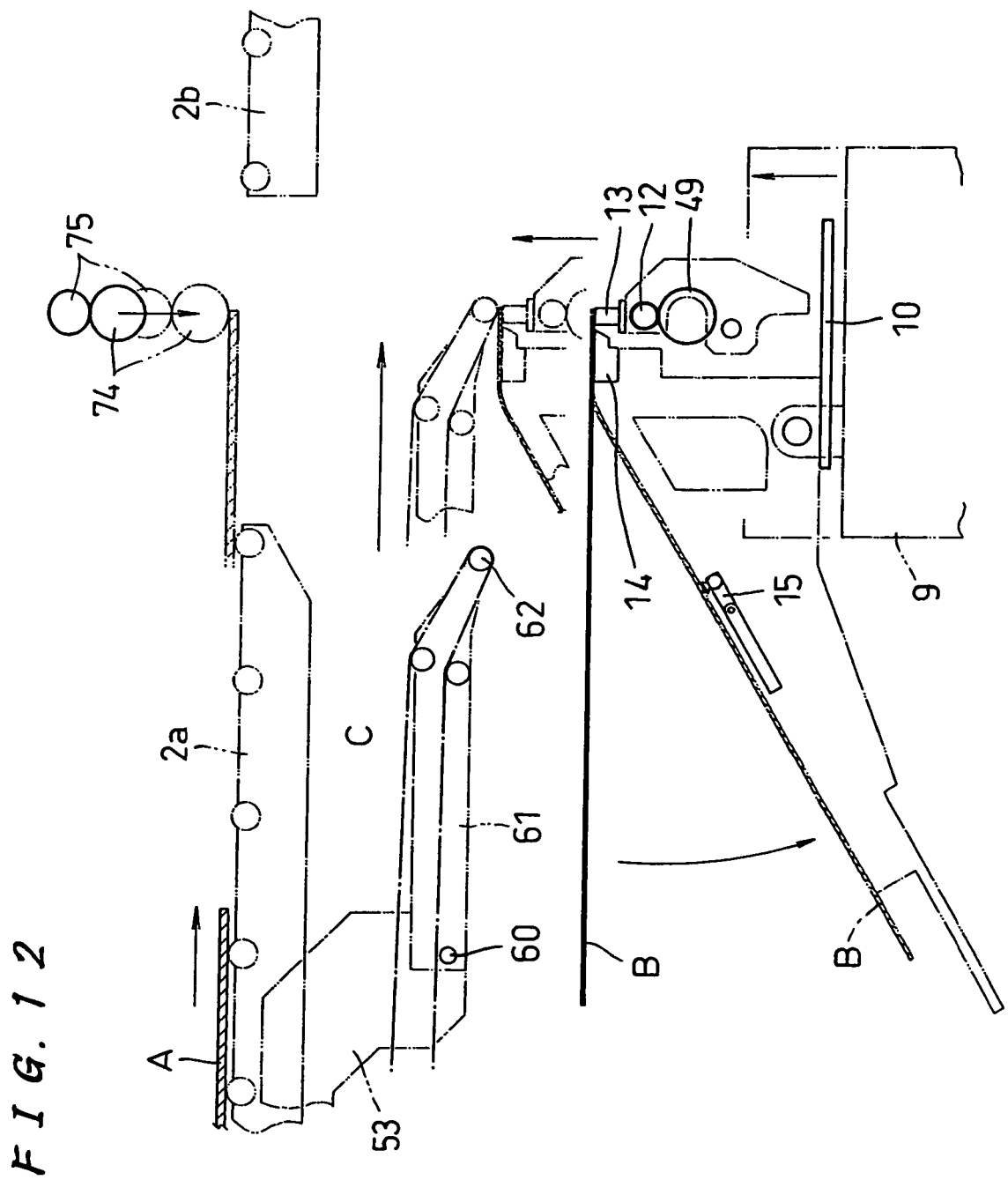
FIG. 12 is an explanatory front view showing operation of the separate sheet peel unit.

As shown in FIG. 12, when the tip of the liquid crystal panel A conveyed by the roller conveyer 2a on the carry-in side enters the sticking position 3 and reaches a position just below the press roller mechanism 6, it is detected by the sensor, feeding of the roller conveyer 2a on the carry-in side is stopped, and the press roller 74 of the press roller mechanism 6 moves down and comes into contact with the top surface of the liquid crystal panel A.

The tip of the polarizer B supplied from a side in a state where it is positioned on the mounting member 11 of the polarizer sticking unit 5 is placed on the first and second vacuum holders 13 and 14 in state where the protection film D is an under surface and the separate sheet is an upper surface. The first and second vacuum holders 13 and 14 vacuum hold and position the front end side of the polarizer B by their attraction force, and the polarizer B is deflected in an arc shape along the guide plate 26 so that its rear portion is supported on the tilted mounting plate 32.

Therefore, the polarizer B is supported on the mounting member 11 in a shape having a horizontal part on the tip side (horizontal surface parallel with the moving direction of the liquid crystal panel A) and the tilted surface part continued from the horizontal part. In this state, in the polarizer sticking unit 5, the elevating frame 9 is elevated by the activation of the motor 18 and, as shown in FIG. 3, the mounting member 11 is elevated only by a stroke $S_1$ so that the horizontal surface of the polarizer B comes to the peel position of the separate sheet E.

When the mounting member 11 stops in the peel position, the mobile frame 53 of the separate sheet peel unit 7 moves toward the polarizer sticking unit 5 only by a stroke $S_2$, and the tip peel roller 62 of the tilting frame 61 stops in the position so as to face the top surface of the tip portion as the horizontal part of the polarizer B.

Since the adhesive tape C of which outer surface is an adhesive surface is wound in a folded state around the tip peel roller 62, the adhesive surface of the adhesive tape C is stuck to the tip of the separate sheet E of the polarizer B.

Figure 13:
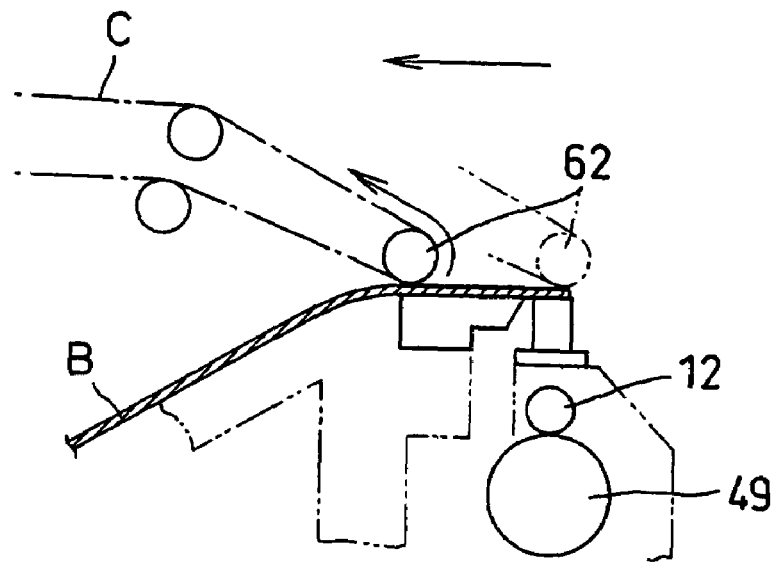
FIG. 13 is an explanatory front view showing operation of the separate sheet peel unit.
Figure 14:
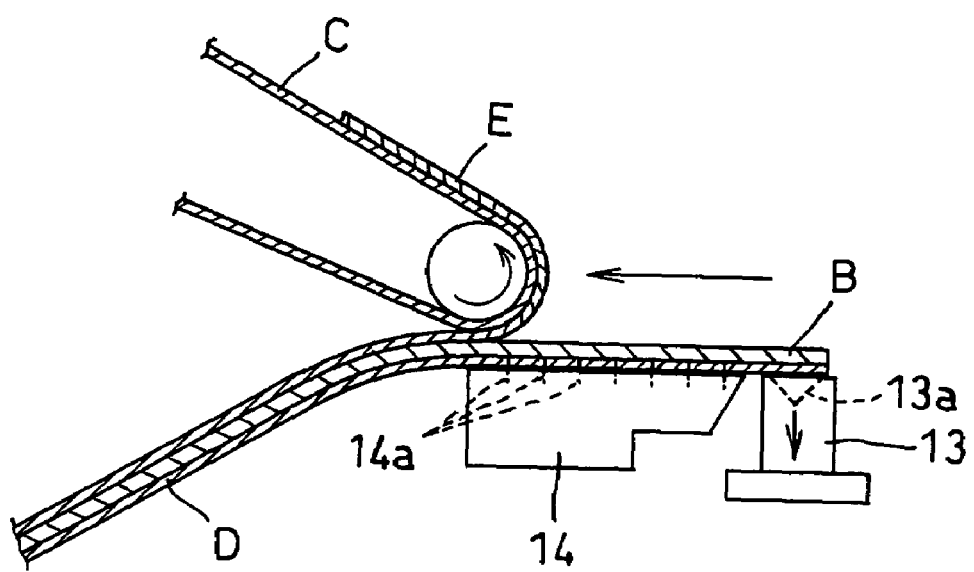
FIG. 14 is an enlarged explanatory diagram of FIG. 13.

As shown in FIGS. 13 and 14, when the adhesive tape C is adhered to the tip of the separate sheet E, the adhesive tape C rotates in the counterclockwise direction as shown by the arrow in the diagrams by the rotation of the adhesive tape supply roll 69 and the take-up roll 70 and the mobile frame 53 of the separate sheet peel unit 7 moves backward, so that the separate sheet E adhered to the adhesive tape C is bonded to the adhesive tape C side and is thereby peeled from the polarizer B held by the first and second vacuum holders 13 and 14. The adhesive surface of the polarizer B is exposed.

Figure 15:
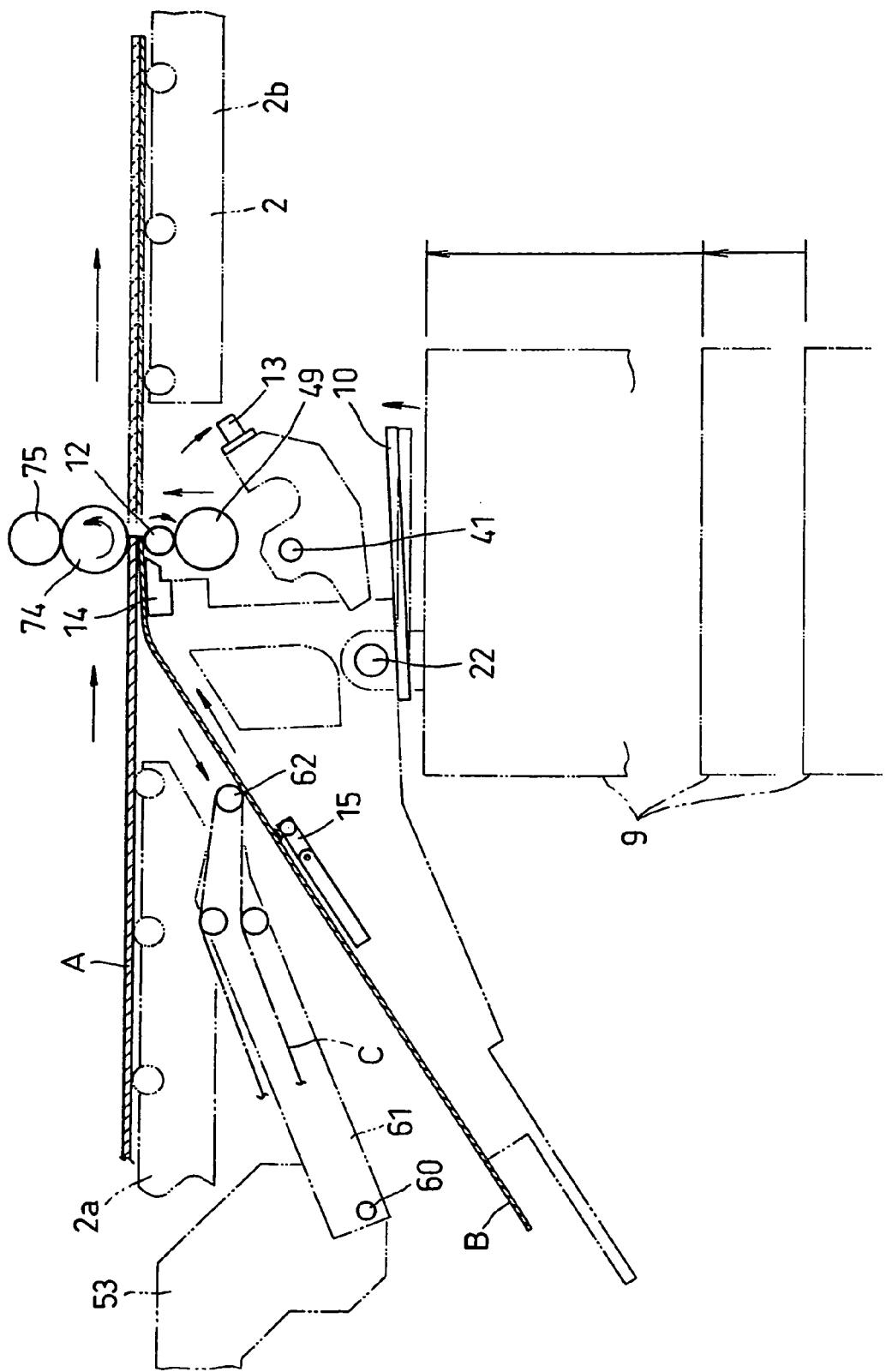
FIG. 15 is an explanatory diagram showing an initial state of sticking of a polarizer to a liquid crystal panel.

After the mobile frame 53 of the separate sheet peel unit 7 moves backward, the mounting member 11 rises as shown by the arrow in FIG. 15 to the sticking position in which the horizontal surface of the supported polarizer B overlaps the under surface of the liquid crystal panel A supported by the roller conveyer 2a on the carry-in side.

Figure 5:
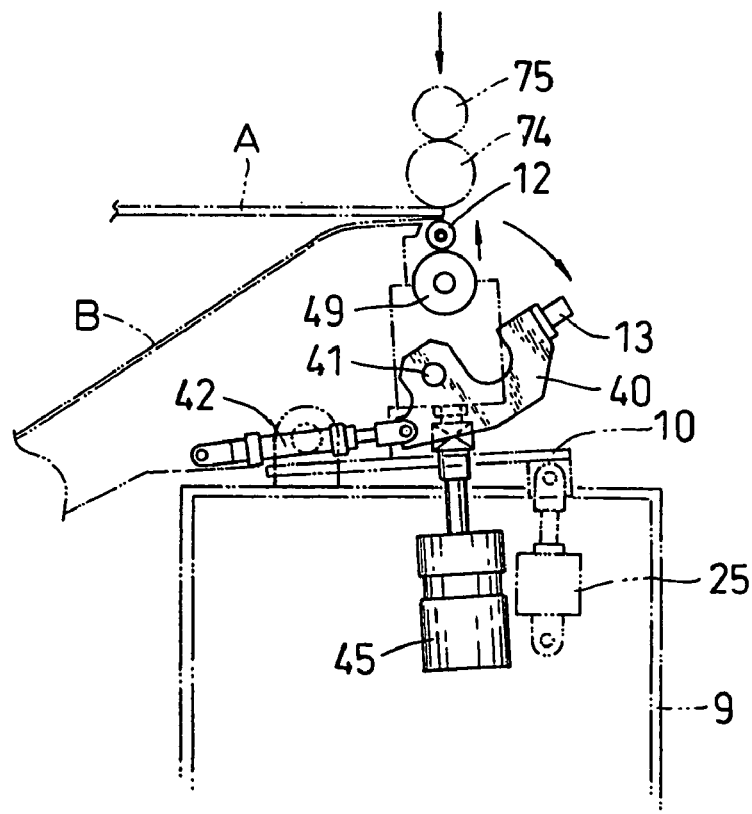
FIG. 5 is a front view showing a state where a first vacuum unit of the polarizer sticking unit tilts so that its right side is down forward.

As shown in FIGS. 5 and 15, when the mounting member 11 rises to the sticking position, the first vacuum holder 13 stops the vacuum holding of the polarizer B, tilts forward by using the spindle 41 as a fulcrum by the contraction of the cylinder 42, and moves so as to be apart from the under surface of the tip of the polarizer B in order to avoid interference with the sticking roller 12. After the first vacuum holder 13 moves apart, the sticking roller 12 is moved upward by expansion of the cylinder 45. By pressing up the under surface of the tip of the polarizer B with the sticking roller 12, the tip of the polarizer B is bonded to the under surface of the tip portion of the liquid crystal panel A of which top surface is received by the press roller 74.

Figure 4:
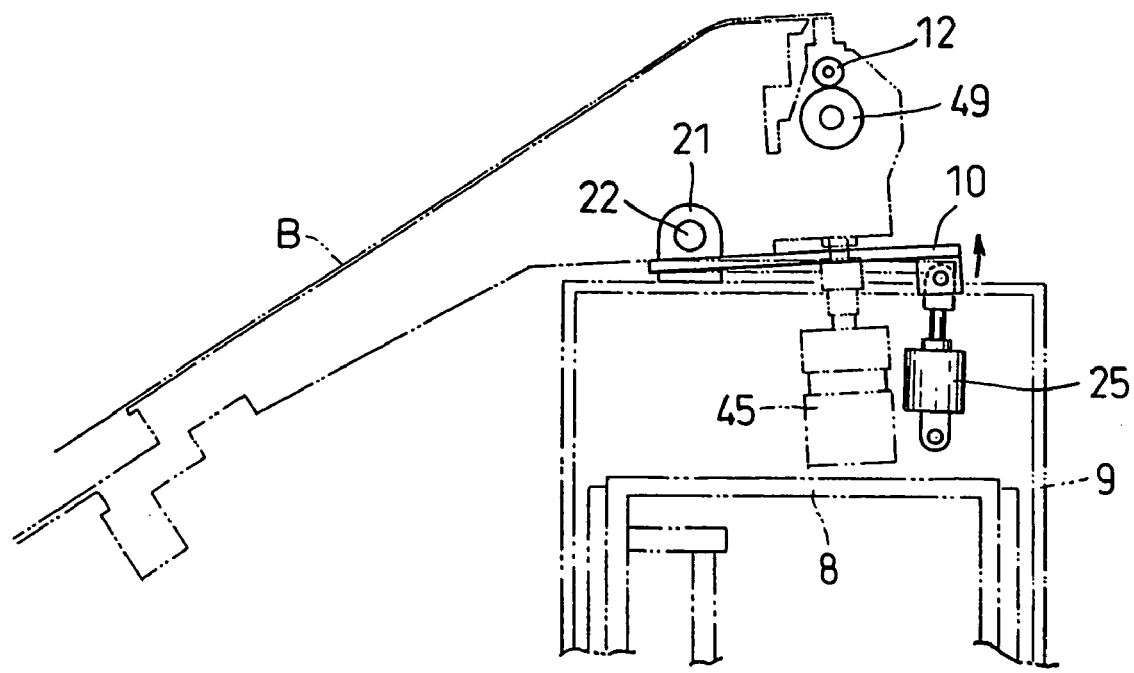
FIG. 4 is a front view showing a state where a tilting unit of the polarizer sticking unit tilts upward from a horizontal state.

At the time of rise to the sticking position of the mounting member 11, as shown in FIGS. 4 and 5, the tilting base 10 of the mounting member 11 tilts so that its rear side moves downward by expansion of the cylinder 25, thereby making the horizontal tip portion held by the second vacuum holder 14 of the polarizer B tilted at an arbitrary angle, for example, only by 1 to 3° so that the rear portion moves downward.

As described above, when the tip of the polarizer B is bonded to the under surface of the tip portion of the liquid crystal panel A, the roller conveyer 2a on the carry-in side starts, the press roller 74 rotates to feed the liquid crystal panel A forward, and the polarizer B of which tip is bonded to the liquid crystal panel A is also integrally led. The attraction force of the second vacuum holder 14 is set at this time point to a degree that the attraction force does not disturb the movement of leading of the polarizer B.

As shown in FIGS. 15 and 16, the polarizer B is adhered, by pressure of the sticking roller 12 and the press roller 74, to the under surface of the liquid crystal panel A moving on the conveyance line 2 while the separate sheet E is peeled. At this time, the sticking part of the polarizer B tilts so that the rear part is downward, so that a small gap can be created between the liquid crystal panel A of the sticking part and the polarizer B. Thus, an excellent sticking state in which no air bubbles are caught in sticking by the pressing of the sticking roller 12 and the press roller 74 is obtained.

The mounting surface of the polarizer in the polarizer sticking unit is constructed by the horizontal surface and the tilted surface, and the unit for peeling the separate sheet of the polarizer is disposed movable toward/apart from the horizontal surface. Therefore, the separate sheet peel unit can be moved backward at the time of sticking the polarizer to the liquid crystal panel. The liquid crystal panel and the polarizer can be adhered to each other without interposing anything such as the separate sheet peel unit in the sticking portion between them.

At the time of sticking the polarizer B to the liquid crystal panel A, the portion supported on the mounting plate 32 is led. In the tilting frame 61 of the separate sheet peel unit 7, the peel roller 62 is pressed up by the polarizer B by the rise of the mounting member 11 in the receded position. The separate sheet E is continuously peeled from the polarizer B in a bent state above the mobile frame 53. When the sensor 33 senses the rear end of the polarizer B, the third vacuum holder 15 which stands by in the receded position vacuum-holds the rear end portion of the polarizer B. The third vacuum holder 15 moves so as to follow the movement of the polarizer B. At the time point when the rear end portion of the polarizer B reaches the part of the guide plate 26 as shown in FIG. 8, the third vacuum holder 15 bends downward, thereby holding the rear end of the polarizer B horizontally and preventing the rear end of the polarizer B from curling up.

In such a manner, by passing the full liquid crystal panel A between the stick roller 12 and the press roller 74, sticking of the polarizer B to the full under surface of the liquid crystal panel A is completed. As shown in FIG. 1, in the polarizer sticking unit 5, the tilting base 10 becomes horizontal again, the stick roller 12 moves downward, the first vacuum holder 13 stands upright, the third vacuum holder 15 returns to the receded position, and the mounting member 11 of the polarizer B stands by in the descend position. In the press roller mechanism 6, the press roller 74 moves back to the rise position upper than the conveyance line 2. In the separate sheet peel unit 7, the mobile frame 53 is in the receded position with respect to the polarizer sticking unit 5, and the tilting frame 61 returns to the initial horizontal state.

As described above, according to the invention, while moving the substrate in one direction from the carry-in side to the carry-out side along the conveyance line, the separate sheet of the polarizer is peeled and the polarizer is adhered to the substrate. Thus, sticking of the polarizer to the substrate can be performed without using a stage. By reducing the space and making the apparatus compact as much as possible, the method and apparatus become particularly suitable for a large substrate. On completion of the sticking of the polarizer to the substrate, the substrate has already been transferred onto the conveyance line of the following process. Thus, the work efficiency is extremely high, and the throughput is improved.

By sticking the horizontal surface parallel with the movement direction of the substrate of the mounting surface of the polarizer to the substrate in a tilted state, a small gap is formed between the substrate and the polarizer in the sticking part. Thus, an excellent stick state without catching air bubbles can be obtained.

The sticking work is performed while holding the polarizer at the time of sticking the polarizer to the substrate, and the end portion of the polarizer moving on the mounting surface is held. Consequently, the end portion of the polarizer is not curled up. As a result, the polarizer can be stuck to the substrate with high sticking precision without generating air bubbles between the stuck surfaces.

Since the sticking roller is rotatably supported by the roller supporting member, and the roller supporting member is supported in the elevating box which is elevated by the driver via a cushioning material, the sticking pressure of the polarizer to the substrate becomes optimum. Therefore, the polarizer can be stuck without applying stress to the substrate.

Further, by providing the press roller mechanism for sandwiching the substrate in cooperation with the sticking roller in a position opposite to the sticking roller, the substrate can be supported at the time of sticking the polarizer to the substrate. Thus, without providing a stage for supporting the substrate on the conveyance line, the substrate can be stably conveyed to the sticking position and the polarizer can be stuck with high precision. Thus, the substrate side can be formed without using a stage, the space can be reduced, and the apparatus can be simplified.

What is claimed is:

1. The method of sticking a polarizer to a substrate, comprising:
   - moving a substrate in one direction along a conveyance line from an input side to an output side,
   - peeling a separate sheet from a polarizer to expose an adhesive layer,
   - tilting a mounting surface of said polarizer from a horizontal position to from a gap between said polarizer and said substrate; and
   - at a location after the gap in the movement direction of said substrate, sticking the polarizer to said substrate.

2. The method for sticking a polarizer to a substrate according to claim 1, further comprising:
   - holding an end portion of the polarizer at the time of the sticking operation.

3. A system for sticking a polarizer to a substrate, comprising:
   - a conveyance line for moving a substrate in one direction from an input side to a side;
   - a polarizer sticking unit for holding a polarizer;
   - a peel unit for peeling a separate sheet which is preliminarily adhered on a surface of said polarizer,
   - said polarizer sticking unit has a sticking roller for pressing said polarizer against the substrate in a sticking position which is positioned along said conveyance line to thereby stick said polarizer onto the substrate
   - a holder for holding a trailing end portion of the polarizer along said conveyance line, said holder being movable to follow the movement of said polarizer.

4. The system for sticking apolarizer to a substrate according to claim 3, wherein said polarizer sticking unit has a mounting surface and a tilting mechanism for tilting the mounting surface at the time of sticking the polarizer to said substrate.

5. The system for sticking a polarizer to a substrate according to claim 3, wherein said sticking roller is rotatably supported by a roller supporting member, and the roller supporting member is supported in an elevation box, further including a driver for elevating said elevation box and via a cushioning material associated with said driver.

6. The system for sticking apolarizer to a substrate according to claim 3, further comprising apress roller mechanism for sandwiching said substrate in cooperation with said sticking roller, wherein saidpress roller is provided in a position opposite to said sticking roller.

* * * * *